Dec. 24, 1940. D. BRUCE 2,225,975
TEMPERATURE COMPENSATION OF THERMAL DEVICES
Filed June 19, 1939
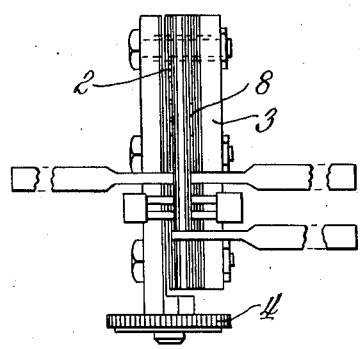
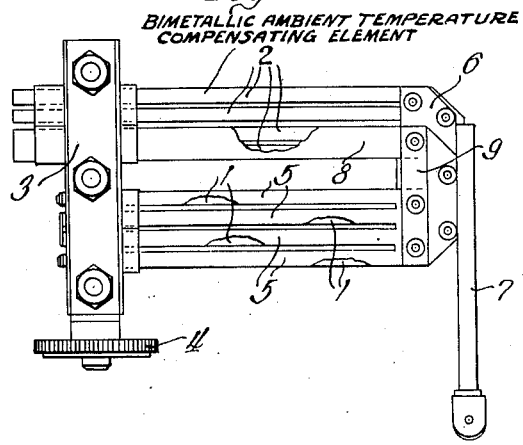
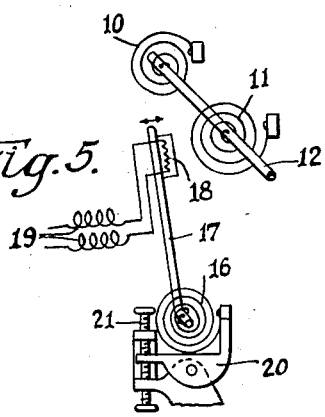
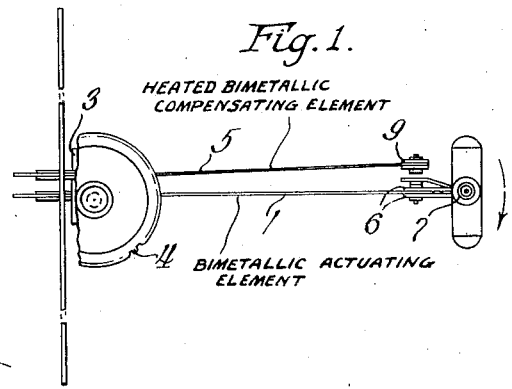
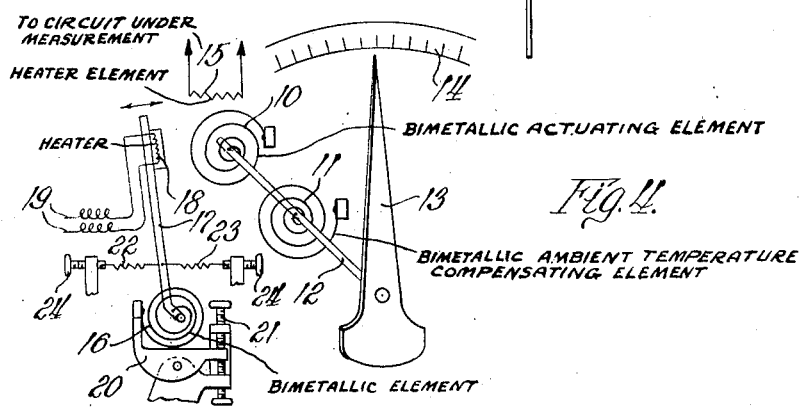
Inventor
Douglas Bruce Patented Dec. 24, 1940

2,225,975

UNITED STATES PATENT OFFICE 2,225,975

TEMPERATURE COMPENSATION OF THERMAL DEVICES

Douglas Bruce, Toronto, Ontario, Canada, assignor to Sangamo Electric Company, Springfield, Ill.

Application June 19, 1939, Serial No. 279,797
In Canada March 30, 1939

6 Claims. (Cl. 171—95)

The principal objects of this invention are to effect an accurate compensation for inaccuracies of response in thermal devices due to the variable rate of radiation encountered at high and low temperatures and to provide a device of this nature which will be more dependable and accurate under the variable conditions encountered in service.

The principal feature of the invention resides broadly in the provision of a heating element which, in response to changes in ambient temperature, is variably positioned relative to a thermally responsive member of a thermal device.

In the drawing:

Figure 1 is an underside plan view of a thermally responsive device illustrating a preferred form of the present invention applied thereto;

Figure 2 is a side elevational view of the construction shown in Figure 1;

Figure 3 is a terminal end elevational view;

Figure 4 is a diagrammatic view illustrating a modified form of application of the present invention; and Figure 5 is a diagrammatic view showing a modification in the construction of the embodiment of my invention shown in Figure 4 of the drawing.

In the production of thermally responsive devices, such as for measuring the flow of electric current, it is the usual practice to provide oppositional thermally responsive elements, one of which is subjected to temperature variations in relation to the flow of current while the other is subjected only to ambient temperatures as a means of compensating the influence of ambient temperatures on the active or heated element.

A thermally responsive device of this nature is shown in Canada Patent 332,522, granted May 16, 1933, to which the present invention has been applied by way of illustration.

The escape of heat from a heated thermostatic or bimetallic member is largely by radiation. It is found in practice, however, that radiation increases as the temperature of the thermally responsive member rises, with the result that the thermally responsive member, which may be a bi-metallic strip carrying a given amount of current, will be maintained at a somewhat lower temperature above ambient at high temperatures than at low temperatures.

The opposing thermally responsive or bimetallic member will not compensate for this rate of change in radiation. Thus for example a meter operating on this principle to have been calibrated at a normal ambient temperature of 70° F., such a meter will be high-reading at low temperatures and low-reading at high temperatures, and in the case of meters such as ammeters or volt meters and precision controls, errors from this source may be quite serious.

It is the purpose of the present invention to accurately compensate for these radiation effects by making use of controlled radiation which in principle consists in mounting a heater by means of a thermally responsive support in influential relation to one of the opposed thermally responsive elements, preferably the active element, so that as the ambient temperature rises the heater is brought closer to the active thermally responsive element, or, in the case of the inactive or opposing thermally responsive element, the heater would be moved farther therefrom in response to a rise in ambient temperature. Thus, though normally a rise in temperature would result in a smaller elevation of the temperature of the active thermally responsive element above ambient, the change in relationship of the heater tends to produce the opposite effect.

Referring now to the form of the invention illustrated in Figures 1 to 3, the active bi-metallic element 1 and the opposing bi-metallic element 2 comprise ribbon-like or hairpin strips which are clamped in a common plane between separable portions of a supporting post 3 which may be rotatably mounted under the control of an adjusting pinion 4, which construction is common to the above-mentioned patent.

A bi-metallic element 5, preferably similar to the bi-metallic element 1 is clamped by the post 3 in side-by-side relation with the element 1 substantially parallel therewith and in suitable spaced relation.

The free end extremities of the elements 1 and 2 are connected together in the usual manner by insulating strips 6 to which is secured an arm 7 adapted to be connected with a pen or pointer.

A control spring strip 8 is here shown also clamped by the post 3 in a plane parallel with the element 5, and the outer free end thereof is connected with the free end of the element 5 by an insulating strip 9. The bi-metallic element 5 is so positioned that it will move in the same direction as the bimetallic element 1, either under the application of applied heat or ambient temperatures.

Both the elements 1 and 5 may advantageously constitute resistance heaters and current may be circulated therethrough either in series or parallel so that the resistance set up therein will heat the respective bi-metallic members 1 and 5 and will cause the same to swing substantially in unison in the direction indicated by the arrow in Figure 1.

With this arrangement it will be appreciated that the presence of the additional bi-metallic element 5 in close proximity to the active element 1 will have the effect of increasing the temperature of the element 1. This effect will be more pronounced at the higher ambient temperatures due to the increase in radiation and/or effectiveness at such high temperatures of the following heater element 5 which will result in advancing the active element 1 by compensating for the greater loss in radiation therefrom which would normally cause the element 1 to lag and thereby give an incorrect reading at the higher temperature.

In practice the element 5 may be adjusted or proportioned in any desirable manner, and similarly the controlling element 8 may be suitably selected or adjusted in order to achieve an extremely accurate compensation for errors in the response of the active element 1, and while the free end of the element 5 does not necessarily actually contact the free end of the active element 1, the elements may, however, be so positioned or related as to achieve a physical contact so as to apply a positive force under certain conditions, should this be desirable.

It will be further appreciated that the rate of response of the elements 1 and 5 may be accurately controlled by adjustment of the relative resistances, such as by varying the width or thickness, a change in relative thickness affecting both the position due to variation of ambient temperature and the deflection due to self-heating. A variation in the composition of the bi-metallic element 5, changing its expansion characteristics, may also be used to give a like result.

With the arrangement illustrated in Figures 1 to 3, the heating of the compensating element 5 is defined as effected by the resistance to current flowing therethrough. However, heating of the compensating element need not be effected in this manner, nor does the compensating element have to be of a nature similar to that of the active element, and in this connection I have illustrated a modification in Figure 4.

The opposed thermally responsive elements 10 and 11 are shown of the spiral form, connected in opposition to a spindle 12 carrying a pointer 13 cooperating with a scale 14. The active element 10 is here shown heated in response to a flow of current through an externally arranged heater or resistance 15 which is connected with the circuit under measurement.

A thermally responsive member 16, here shown as a coiled bi-metallic strip, is operatively connected with an arm 17 which carries a heater 18 which may be heated in any desired manner, here shown electrically by the leads 19 connected with any suitable source of current. The arrangement is such that an increase in ambient temperature, which would normally increase the heating of the active element 10, will act on the element 16 and cause the heater 18 to move into closer influential relation to the active element 10 to compensate for the increase in radiation due to the increase in ambient temperature.

Any suitable form of adjustable mounting may be provided for the element 16 and associated elements, and as an example the element 16 is here shown mounted on a tiltable member 20 which may be adjusted by the screws 21 to initially position the heater 18 in a desired relation to the element 10 or 11, and suitable restraining or assisting spring members 22—23 may be associated with the arm 17 under the control of adjusting screws 24 as a means of controlling the response of the element 16 and thereby the position of the heater 18, due to changes in ambient temperatures.

Conversely, the heater 18 may be mounted in influential relation to the opposing or compensating element 11 to be moved further therefrom on an increase in ambient temperature, as shown in Figure 5 of the drawing. In this arrangement the bimetallic element 16 is reversely mounted on the tiltable member 20 to obtain a reverse control of the heater 19 on change in ambient temperature to the control obtained in the embodiment of Figure 4.

The present invention is applicable to thermally responsive devices of various types and, while I have illustrated the same applied to the flat strip or spiral type of element, it may be applied with equal facility to other types of thermally responsive elements, such as Bourdon tubes or bellows containing an expansile fluid, and the invention will be found particularly suitable in connection with ammeters, volt meters, watt meters, thermal relays or thermostats.

What I claim as my invention is:

1. In an electric meter, the combination of a rotatable spindle carrying indicating means, a thermally responsive active element connected to said spindle, a thermally responsive compensating element connected to said spindle, said active and compensating thermally responsive elements applying torque to said spindle in opposite directions when changed in temperature in the same direction, means for heating said thermally responsive active element in response to the current metered by said electric meter, a heater mounted for movement toward and from said thermally responsive active element, and ambiently influenced thermostatic means for variably positioning said heater in relation to said thermally responsive active element according to changes in ambient temperature to counteract the effect of increased heat radiation from said thermally responsive active element at increased temperatures.

2. In an electric meter, the combination of a rotatable spindle carrying indicating means, a thermally responsive active element connected to said spindle, a thermally responsive compensating element connected to said spindle, said active and compensating thermally responsive elements applying torque to said spindle in opposite directions when changed in temperature in the same direction, means for heating said thermally responsive active element in response to the current metered by said electric meter, a heater mounted for movement toward and from said thermally responsive compensating element, and ambiently influenced thermostatic means for variably positioning said heater in relation to said thermally responsive compensating element according to changes in ambient temperature to counteract the effect of increased radiation of heat from said thermally responsive active element as its temperature increases.

3. In a thermal electric meter, in combination, a thermally responsive meter element, meter indicating means operatively connected with said thermally responsive meter element, electrical heater means for heating said thermally responsive meter element proportionally to a current under measurement, means for compensating said thermally responsive meter element for changes in ambient temperature, and separate heater means shiftably mounted in response to change in ambient temperature for compensating for rate of change of heat radiation from said electrical heater means with change in ambient temperature.

4. In a thermal electric meter, in combination, rotatably mounted means, meter indicating means operatively connected to said rotatably mounted means, a thermally responsive element operatively connected with said rotatably mounted means to rotate the same, electrical heater means for heating said thermally responsive active element proportionally to a current under measurement, means for compensating said thermally responsive active element for changes in ambient temperature, and separate heater means shiftably mounted in response to change in ambient temperature for compensating for rate of change of heat radiation from said electrical heater means with change in ambient temperature.

5. In a thermal electric meter, in combination, a thermally responsive bimetallic meter element fixedly mounted at one end and free to move at the opposite end, meter indicating means operatively connected with said free end, electrical heater means for heating said thermally responsive bimetallic meter element proportionately to a current under measurement, a bimetallic ambient temperature compensating element operatively connected with said thermally responsive bimetallic meter element for compensating the same for changes in ambient temperature, a separate radiant heater, and bimetallic mounting means for shiftably mounting said separate radiant heater according to changes in ambient temperature in heat radiating relationship with said thermally responsive bimetallic meter element, said shiftably mounted separate radiant heater compensating said meter for rate of change in heat radiation from said electrical heater means with change in ambient temperature.

6. In a thermal electric meter, in combination, an adjustable mounting post, a bimetallic meter element in the form of elongated loops of thin bimetallic metal rigidly secured to said post at one end and movable at the other ends, a meter indicating member carried by said movable ends, terminal means for electrically connecting said bimetallic meter element in circuit relationship with a current under measurement whereby the bimetallic meter element is heated by the current passing therethrough to a temperature proportionate to said current under measurement, a bimetallic ambient temperature compensating element in the form of elongated loops of thin bimetallic metal rigidly secured to said post at one end and movable at the other ends, insulation means fastening the movable ends of said bimetallic meter element and the movable ends of said bimetallic ambient temperature compensating element together, said bimetallic meter element and said bimetallic ambient temperature compensating element being disposed to flex in opposite directions on change in ambient temperature, a bimetallic radiant heater element in the form of elongated loops of thin bimetallic metal rigidly secured to said post at one end and freely movable at the other ends, said bimetallic radiant heater element extending from said post alongside said bimetallic meter element in heat radiating relationship therewith, and terminal means for connecting said bimetallic radiant heater element to a heating current source, said bimetallic radiant heater element flexing relatively to said bimetallic meter element on change in ambient temperature to compensate said bimetallic meter element for change in rate of heat radiation on change in ambient temperature.

DOUGLAS BRUCE.